US011269899B2

(12) United States Patent
Bansal et al.

(10) Patent No.: US 11,269,899 B2
(45) Date of Patent: *Mar. 8, 2022

(54) DATABASE QUERY TOOL

(71) Applicant: Bank of America Corporation, Charlotte, NC (US)

(72) Inventors: Gaurav Bansal, Hyderabad (IN); Ashwin Kumar Yedte, Hyderabad (IN); Deviprasad Tatti, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/900,953

(22) Filed: Jun. 14, 2020

(65) Prior Publication Data
US 2020/0334263 A1    Oct. 22, 2020

Related U.S. Application Data

(63) Continuation of application No. 16/217,395, filed on Dec. 12, 2018, now Pat. No. 10,719,520.

(51) Int. Cl.
| G06F 16/2457 | (2019.01) |
| G06F 16/22 | (2019.01) |
| G06F 16/23 | (2019.01) |
| G06F 16/21 | (2019.01) |
| G06N 20/00 | (2019.01) |

(52) U.S. Cl.
CPC ...... *G06F 16/24578* (2019.01); *G06F 16/219* (2019.01); *G06F 16/2237* (2019.01); *G06F 16/2358* (2019.01); *G06N 20/00* (2019.01)

(58) Field of Classification Search
USPC ........................................................ 707/736
See application file for complete search history.

(56) References Cited

U.S. PATENT DOCUMENTS

| 7,895,192 B2 | 2/2011 | Mehta et al. |
| 7,958,113 B2 | 6/2011 | Fan et al. |
| 8,015,190 B1 | 9/2011 | Bayardo et al. |
| 8,204,900 B2 | 6/2012 | Gatton et al. |
| 8,326,826 B1 | 12/2012 | Upstill et al. |
| 8,874,548 B2 | 10/2014 | Wu et al. |
| 9,189,523 B2 | 11/2015 | Ganapathi et al. |
| 9,934,261 B2 | 4/2018 | Kuno et al. |

(Continued)

*Primary Examiner* — Cam Linh T Nguyen

(57) ABSTRACT

A memory stores a first log and a collection of queries. A processor accesses a second log that includes a first, second, third and fourth historical query, determines that the first and second historical queries belong to a first similarity group and the third and fourth historical queries belong to a second similarity group, and ranks the queries within groups based on static and dynamic features. The processor further determines the third historical query is frequently submitted and copies the highest ranked similar queries into the collection. The processor receives a first database query, stores it in both logs, determines it is not similar to queries stored in memory, further determines that it belongs to the first similarity group, copies the highest ranked similar queries to the first log, and returns a report containing the similar queries. The processor further receives and executes a second query selected from the report.

20 Claims, 5 Drawing Sheets

(56) References Cited

U.S. PATENT DOCUMENTS

| | | | |
|---|---|---|---|
| 2007/0217676 A1* | 9/2007 | Grauman | G06K 9/6212 |
| | | | 382/170 |
| 2010/0030780 A1* | 2/2010 | Eshghi | G06F 16/56 |
| | | | 707/758 |
| 2010/0082507 A1 | 4/2010 | Ganapathi et al. | |
| 2011/0196851 A1* | 8/2011 | Vadlamani | G06F 16/9535 |
| | | | 707/706 |
| 2016/0042253 A1 | 2/2016 | Sawhney et al. | |
| 2017/0075887 A1* | 3/2017 | Drake | G06F 16/51 |
| 2017/0249339 A1* | 8/2017 | Lester | G06F 16/56 |
| 2017/0337326 A1 | 11/2017 | Zhang et al. | |
| 2018/0095967 A1 | 4/2018 | Kota | |
| 2019/0266257 A1 | 8/2019 | Natchu et al. | |
| 2020/0026772 A1 | 1/2020 | Wheeler | |

\* cited by examiner

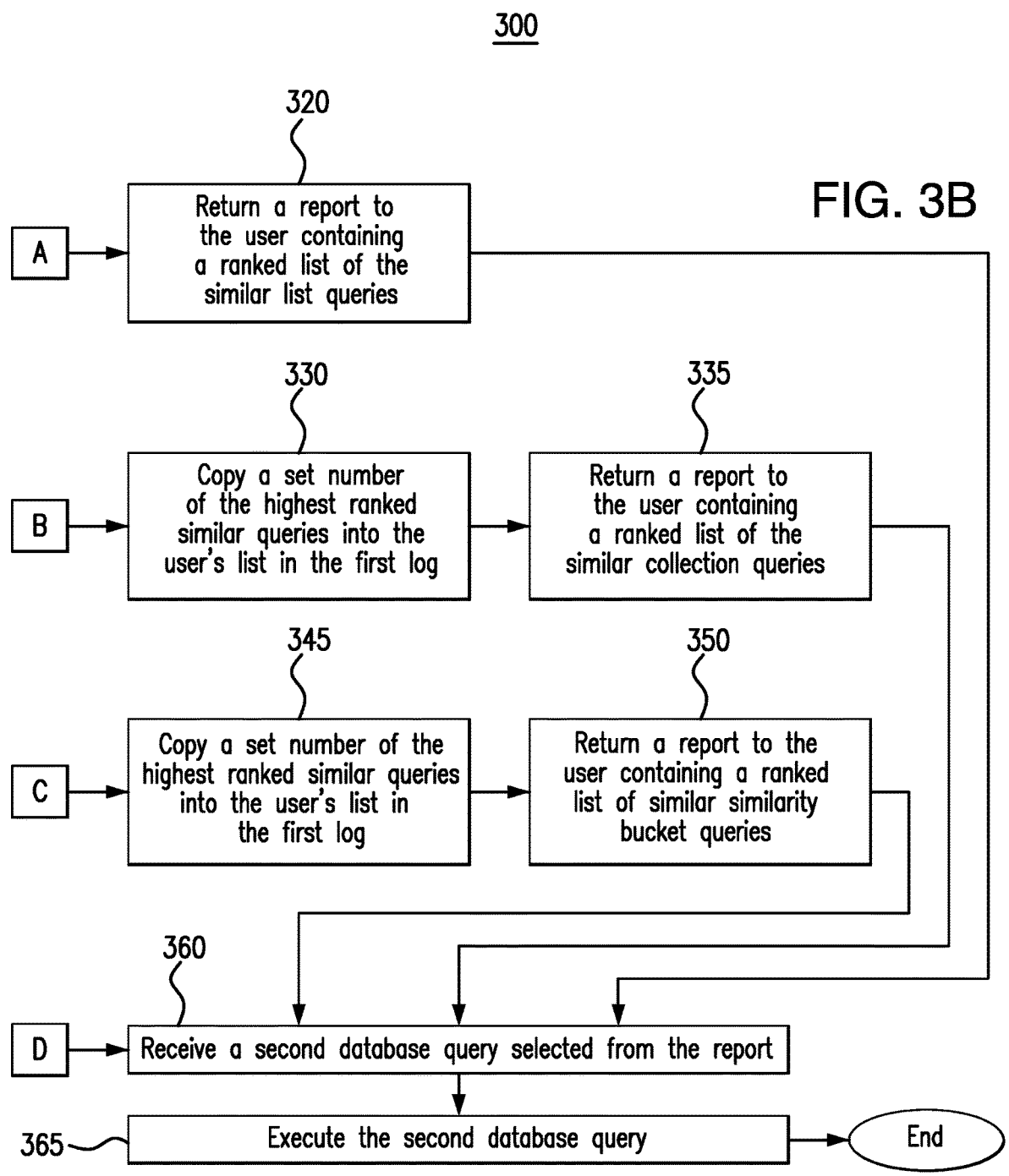

DATABASE QUERY TOOL

CROSS-REFERENCE TO RELATED APPLICATIONS

This application is a continuation of U.S. patent application Ser. No. 16/217,395 filed Dec. 12, 2018, by Gaurav Bansal et al., and entitled "DATABASE QUERY TOOL," which is incorporated herein by reference.

TECHNICAL FIELD

This disclosure relates generally to the access of data stored within databases.

BACKGROUND

Computer databases are commonly used by organizations to store large amounts of data. To access such data, users create and submit queries to the databases, where the queries are written in a standardized language, such as the Structured Query Language (SQL).

SUMMARY OF THE DISCLOSURE

Computer databases are commonly used by organizations to store large amounts of data. To access such data, users create and submit queries to the databases, where the queries are written in a standardized language, such as the Structured Query Language (SQL). Languages like SQL, however, are complex and difficult to learn. As a result, database users often are not experts in query construction, and tend to produce queries that are sub-optimal, when measured by the amount of resources needed by the computer to execute the queries. Furthermore, when multiple users access a database simultaneously, queries that may have been optimal when submitted by a user in isolation can become sub-optimal as a result of the current computer resource demands created by the other users.

This disclosure contemplates an unconventional database tool that addresses one or more of the above issues. The database tool uses historical queries previously submitted to the database to create groups of similar queries, where each query in a group is within a percentage of similarity to all the other queries within the same group. The percent similarity is calculated, for example, by splitting each query into a set of features, forming a pair of vectors using the features, and computing the cosine similarity between the two vectors. The database tool then stores groups of similar queries in similarity buckets, where each similarity bucket corresponds to a specific percent similarity range. Within each group, the database tool initially creates a ranked list of the most optimal queries, based on static features of the query and the database, such as the query features, cardinality, join conditions, etc. The database tool then periodically re-ranks the queries based on dynamic features, such as the network traffic, memory usage, and CPU usage.

When a user submits a query to the database, the database tool checks whether any historical queries are present that are similar within a given threshold to the newly submitted query, and then returns a report to the user containing either a ranked list of similar historical queries, or, if no similar historical queries are present, an estimate of the time required to run the user's proposed query. To decrease the amount of time required for the database tool to search for similar queries, the database tool stores in memory both those historical queries that are similar to a user's previously submitted queries, and those historical queries that are similar to queries that all users submit with high frequency. Then, when searching for the presence of similar historical queries, the database tool first compares the submitted query to those historical queries stored within the memory. Certain embodiments of the database tool are described below.

According to one embodiment, an apparatus includes a memory and a hardware processor communicatively coupled to the memory. The memory stores a first log and a collection of queries. The processor accesses a second log stored in a database. The second log includes a first historical query, a second historical query, a third historical query, and a fourth historical query. The processor further splits the first historical query into a first set of features, splits the second historical query into a second set of features, splits the third historical query into a third set of features, and splits the fourth historical query into a fourth set of features. The processor then forms a first vector comprising the first set of features, forms a second vector comprising the second set of features, forms a third vector comprising the third set of features, and forms a fourth vector comprising the fourth set of features. The processor then computes a first dot product of the first vector and the second vector, computes a first similarity index based on the first dot product, computes a second dot product of the third vector and the fourth vector, computes a second similarity index based on the second dot product, computes a third dot product of the first vector and the third vector, computes a third similarity index based on the third dot product, computes a fourth dot product of the first vector and the fourth vector, computes a fourth similarity index based on the fourth dot product, computes a fifth dot product of the second vector and the third vector, computes a fifth similarity index based on the fifth dot product, computes a sixth dot product of the second vector and the fourth vector, and computes a sixth similarity index based on the sixth dot product. The processor further determines that the first similarity index falls within a first range and that none of the third similarity index, the fourth similarity index, the fifth similarity index and the sixth similarity index fall within the first range. In response to determining that the first similarity index falls within the first range and that none of the third similarity index, the fourth similarity index, the fifth similarity index and the sixth similarity index fall within the first range, the processor stores the first historical query and the second historical query as a first similarity group in a first bucket corresponding to the first range, ranks the first historical query and the second historical query in the first similarity group at a first time based on a set of static system features, and re-ranks the first historical query and the second historical query in the first similarity group at a second time based on a set of dynamic system features. The processor further determines that the second similarity index falls within a second range, the second range lower than the first range, and that none of the third similarity index, the fourth similarity index, the fifth similarity index and the sixth similarity index fall within the second range. In response to determining that the second similarity index falls within the second range and that none of the third similarity index, the fourth similarity index, the fifth similarity index and the sixth similarity index fall within the second range, the processor stores the third historical query and the fourth historical query as a second similarity group in a second bucket corresponding to the second range, ranks the third historical query and the fourth historical query in the second similarity group at the first time based on the set of static system features, and re-ranks the third historical query and the fourth historical query in the second similarity group at the second time based on the set of dynamic system features. The processor further determines that a plurality of users submit the third historical query at a frequency greater than a set frequency. In response to determining that the plurality of users submit the third historical query at the frequency greater than the set frequency, the processor copies a set number of the highest ranked historical queries from the second similarity group into the collection of queries in a cache bucket corresponding to the second range. The processor further receives a first database query from a user. In response to receiving the first database query, the processor stores the first database query in the first log in a list corresponding to the user, stores the first database query in the second log, splits the first database query into a fifth set of features, and splits a list query stored in the first log in the list corresponding to the user into a sixth set of features. The processor then forms a fifth vector comprising the fifth set of features, forms a sixth vector comprising the sixth set of features, computes a seventh dot product of the fifth vector and the sixth vector, and computes a seventh similarity index based on the seventh dot product. The processor further determines that the seventh similarity index is not within a threshold. In response to determining that the seventh similarity index is not within the threshold, the processor splits a collection query stored in the collection of queries into a seventh set of features, forms a seventh vector comprising the seventh set of features, computes an eighth dot product of the fifth vector and the seventh vector, and computes an eighth similarity index based on the eighth dot product. The processor then determines that the eighth similarity index is not within the threshold. In response to determining that the eighth similarity index is not within the threshold, the processor determines that the first range is greater than the threshold. In response to determining that the first range is greater than the threshold, the processor calculates a ninth dot product of the fifth vector and the first vector, calculates a ninth similarity index based on the ninth dot product, calculates a tenth dot product of the fifth vector and the second vector, and calculates a tenth similarity index based on the tenth dot product. The processor then determines that the first similarity index, the ninth similarity index, and the tenth similarity index fall within the first range. In response to determining that the first similarity index, the ninth similarity index, and the tenth similarity index fall within the first range, the processor stores the database query in the first similarity group, copies the set number of the highest ranked historical queries from the first similarity group to the first log, and returns a report to the user containing a second set number of the highest ranked queries from the first similarity group. The processor further receives a second database query selected from the report by the user and executes the second database query.

According to another embodiment, a method includes accessing a second log stored in a database. The second log includes a first historical query, a second historical query, a third historical query, and a fourth historical query. The method also includes splitting the first historical query into a first set of features, splitting the second historical query into a second set of features, splitting the third historical query into a third set of features, and splitting the fourth historical query into a fourth set of features. The method further includes forming a first vector comprising the first set of features, forming a second vector comprising the second set of features, forming a third vector comprising the third set of features, and forming a fourth vector comprising the fourth set of features. The method further includes computing a first dot product of the first vector and the second vector, computing a first similarity index based on the first dot product, computing a second dot product of the third vector and the fourth vector, computing a second similarity index based on the second dot product, computing a third dot product of the first vector and the third vector, computing a third similarity index based on the third dot product, computing a fourth dot product of the first vector and the fourth vector, computing a fourth similarity index based on the fourth dot product, computing a fifth dot product of the second vector and the third vector, computing a fifth similarity index based on the fifth dot product, computing a sixth dot product of the second vector and the fourth vector, and computing a sixth similarity index based on the sixth dot product. The method further includes determining that the first similarity index falls within a first range and that none of the third similarity index, the fourth similarity index, the fifth similarity index and the sixth similarity index fall within the first range. In response to determining that the first similarity index falls within the first range and that none of the third similarity index, the fourth similarity index, the fifth similarity index and the sixth similarity index fall within the first range, the method includes storing the first historical query and the second historical query as a first similarity group in a first bucket corresponding to the first range, ranking the first historical query and the second historical query in the first similarity group at a first time based on a set of static system features, and re-ranking the first historical query and the second historical query in the first similarity group at a second time based on a set of dynamic system features. Additionally, the method includes determining that the second similarity index falls within a second range, the second range lower than the first range, and that none of the third similarity index, the fourth similarity index, the fifth similarity index and the sixth similarity index fall within the second range. In response to determining that the second similarity index falls within the second range and that none of the third similarity index, the fourth similarity index, the fifth similarity index and the sixth similarity index fall within the second range, the method includes storing the third historical query and the fourth historical query as a second similarity group in a second bucket corresponding to the second range, ranking the third historical query and the fourth historical query in the second similarity group at the first time based on the set of static system features, and re-ranking the third historical query and the fourth historical query in the second similarity group at the second time based on the set of dynamic system features. The method further includes determining that a plurality of users submit the third historical query at a frequency greater than a set frequency. In response to determining that the plurality of users submit the third historical query at the frequency greater than the set frequency, the method includes copying a set number of the highest ranked historical queries from the second similarity group into the collection of queries in a cache bucket corresponding to the second range. The method further includes receiving a first database query from a user. In response to receiving the first database query, the method includes storing the first database query in a first log in a list corresponding to the user, storing the first database query in the second log, splitting the first database query into a fifth set of features, and splitting a list query stored in the first log in the list corresponding to the user into a sixth set of features. The method further includes forming a fifth vector comprising the fifth set of features, forming a sixth vector comprising the sixth set of features, computing a seventh dot product of the fifth vector and the sixth vector, and computing a seventh similarity index based on the seventh dot product. The method further includes determining that the seventh similarity index is not within a threshold. In response to determining that the seventh similarity index is not within the threshold, the method includes splitting a collection query stored in a collection of queries into a seventh set of features, forming a seventh vector comprising the seventh set of features, computing an eighth dot product of the fifth vector and the seventh vector, and computing an eighth similarity index based on the eighth dot product. The method also includes determining that the eighth similarity index is not within the threshold. In response to determining that the eighth similarity index is not within the threshold, the method includes determining that the first range is greater than the threshold. In response to determining that the first range is greater than the threshold, the method includes computing a ninth dot product of the fifth vector and the first vector, computing a ninth similarity index based on the ninth dot product, computing a tenth dot product of the fifth vector and the second vector, and computing a tenth similarity index based on the tenth dot product. The method further includes determining that the first similarity index, the ninth similarity index, and the tenth similarity index fall within the first range. In response to determining that the first similarity index, the ninth similarity index, and the tenth similarity index fall within the first range, the method includes storing the database query in the first similarity group, copying the set number of the highest ranked historical queries from the first similarity group to the first log, and returning a report to the user containing a second set number of the highest ranked queries from the first similarity group. The method further includes receiving a second database query selected from the report by the user and executing the second database query.

According to a further embodiment, a system includes a storage element and a processing element communicatively coupled to the storage element. The storage element is operable to store a first log and a collection of queries. The processing element is operable to access a second log stored in a database. The second log includes a first historical query, a second historical query, a third historical query, and a fourth historical query. The processing element is further operable to split the first historical query into a first set of features, split the second historical query into a second set of features, split the third historical query into a third set of features, and split the fourth historical query into a fourth set of features. The processing element is further operable to form a first vector comprising the first set of features, form a second vector comprising the second set of features, form a third vector comprising the third set of features, and form a fourth vector comprising the fourth set of features. The processing element is additionally operable to compute a first dot product of the first vector and the second vector, compute a first similarity index based on the first dot product, compute a second dot product of the third vector and the fourth vector, compute a second similarity index based on the second dot product, compute a third dot product of the first vector and the third vector, compute a third similarity index based on the third dot product, compute a fourth dot product of the first vector and the fourth vector, compute a fourth similarity index based on the fourth dot product, compute a fifth dot product of the second vector and the third vector, compute a fifth similarity index based on the fifth dot product, compute a sixth dot product of the second vector and the fourth vector, and compute a sixth similarity index based on the sixth dot product. The processing element is further operable to determine that the first similarity index falls within a first range and that none of the third similarity index, the fourth similarity index, the fifth similarity index and the sixth similarity index fall within the first range. In response to determining that the first similarity index falls within the first range and that none of the third similarity index, the fourth similarity index, the fifth similarity index and the sixth similarity index fall within the first range, the processing element is operable to store the first historical query and the second historical query as a first similarity group in a first bucket corresponding to the first range and rank the first historical query and the second historical query in the first similarity group at a first time based on a set of static system features. The set of static system features includes query features, cardinality, join conditions, and filter conditions. The processing element is further operable to re-rank the first historical query and the second historical query in the first similarity group at a second time based on a set of dynamic system features. The set of dynamic system features includes network traffic, memory usage, and CPU usage. The processing element is further operable to determine that the second similarity index falls within a second range, the second range lower than the first range, and that none of the third similarity index, the fourth similarity index, the fifth similarity index and the sixth similarity index fall within the second range. In response to determining that the second similarity index falls within the second range and that none of the third similarity index, the fourth similarity index, the fifth similarity index and the sixth similarity index fall within the second range, the processing element is operable to store the third historical query and the fourth historical query as a second similarity group in a second bucket corresponding to the second range, rank the third historical query and the fourth historical query in the second similarity group at the first time based on the set of static system features, and re-rank the third historical query and the fourth historical query in the second similarity group at the second time based on the set of dynamic system features. The processing element is further operable to determine that a plurality of users submit the third historical query at a frequency greater than a set frequency. In response to determining that the plurality of users submit the third historical query at the frequency greater than the set frequency, the processing element is operable to copy a set number of the highest ranked historical queries from the second similarity group into the collection of queries in a cache bucket corresponding to the second range. The processing element is further operable to receive a first database query from a user. In response to receiving the first database query, the processing element is operable to store the first database query in the first log in a list corresponding to the user, store the first database query in the second log, split the first database query into a fifth set of features, and split a list query stored in the first log in the list corresponding to the user into a sixth set of features. The processing element is also operable to form a fifth vector comprising the fifth set of features, form a sixth vector comprising the sixth set of features, compute a seventh dot product of the fifth vector and the sixth vector, and compute a seventh similarity index based on the seventh dot product. The processing element is further operable to determine that the seventh similarity index is not within a threshold. In response to determining that the seventh similarity index is not within the threshold, the processing element is operable to split a collection query stored in the collection of queries into a seventh set of features, form a seventh vector comprising the seventh set of features, compute an eighth dot product of the fifth vector and the seventh vector, and compute an eighth similarity index based on the eighth dot product. The processing element is further operable to determine that the eighth similarity index is not within the threshold. In response to determining that the eighth similarity index is not within the threshold, the processing element is operable to determine that the first range is greater than the threshold. In response to determining that the first range is greater than the threshold, the processing element is operable to calculate a ninth dot product of the fifth vector and the first vector, calculate a ninth similarity index based on the ninth dot product, calculate a tenth dot product of the fifth vector and the second vector, and calculate a tenth similarity index based on the tenth dot product. The processing element is further operable to determine that the first similarity index, the ninth similarity index, and the tenth similarity index fall within the first range. In response to determining that the first similarity index, the ninth similarity index, and the tenth similarity index fall within the first range, the processing element is operable to store the database query in the first similarity group, copy the set number of the highest ranked historical queries from the first similarity group to the first log, and return a report to the user containing a second set number of the highest ranked queries from the first similarity group. The processing element is further operable to receive a second database query selected from the report by the user and execute the second database query.

Certain embodiments provide one or more technical advantages. For example, an embodiment will identify a sub-optimal user query and provide the user with a choice of similar queries the user could execute instead and thereby avoid wasting valuable computer resources. As another example, an embodiment monitors system resource usage and prioritizes similar historical queries according to resource availability, such that, for example, when memory usage in the system is high and a user submits a query that requires a large amount of memory to execute, the embodiment will suggest similar historical queries that require lower amounts of memory. As a further example, an embodiment reduces the time required by the database tool to search for historical queries similar to a newly submitted user query, by storing both the user's historical queries and frequently submitted historical queries in memory, along with highly ranked similar historical queries. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 3A and 3B present a flowchart illustrating the process by which the database tool in the system of FIG. 1 determines whether similar historical queries exist for a newly submitted user query.

DETAILED DESCRIPTION

Figure 1:
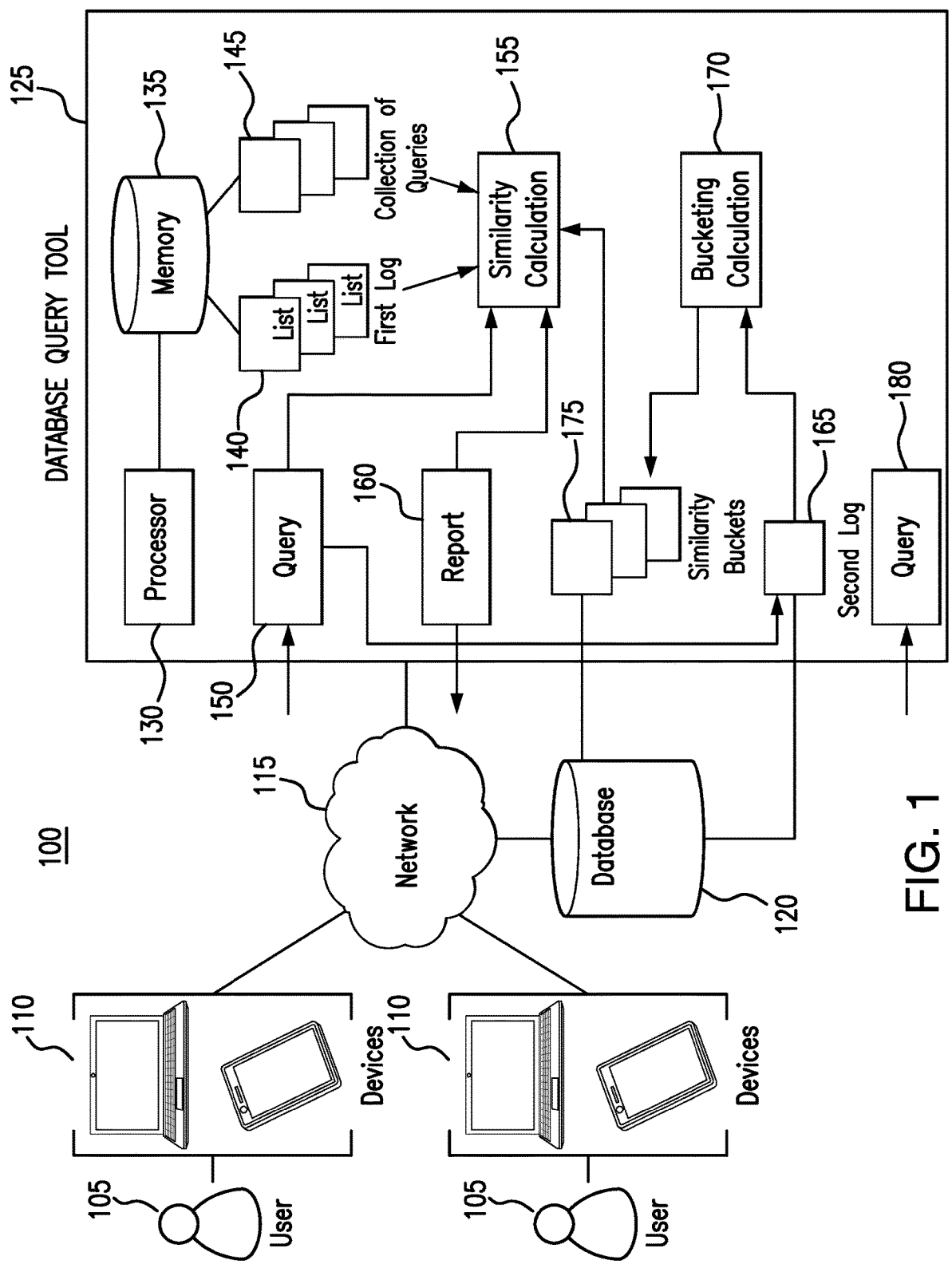
FIG. 1 illustrates an example system.

Embodiments of the present disclosure and its advantages are best understood by referring to FIGS. 1 through 3 of the drawings, like numerals being used for like and corresponding parts of the various drawings.

Computer databases are commonly used by organizations to store large amounts of data. To access such data, users create and submit queries to the databases, where the queries are written in a standardized language, such as the Structured Query Language (SQL). Languages like SQL, however, are complex and difficult to learn. As a result, database users often are not experts in query construction, and tend to produce queries that are sub-optimal, when measured by the amount of resources needed by the computer to execute the queries. Furthermore, when multiple users access a database simultaneously, queries that may have been optimal when submitted by a user in isolation can become sub-optimal as a result of the current computer resource demands created by the other users.

This disclosure contemplates an unconventional database tool that addresses one or more of the above issues. The database tool uses historical queries previously submitted to the database to create groups of similar queries, where each query in a group is within a percentage of similarity to all the other queries within the same group. The percent similarity is calculated, for example, by splitting each query into a set of features, forming a pair of vectors using the features, and computing the cosine similarity between the two vectors. The database tool then stores groups of similar queries in similarity buckets, where each similarity bucket corresponds to a set percent similarity range. Within each group, the database tool initially creates a ranked list of the most optimal queries, based on static features of the query and the database, such as the query features, cardinality, join conditions, etc. The database tool then periodically re-ranks the queries based on dynamic features, such as the network traffic, memory usage, and CPU usage. When a user submits a query to the database, the database tool checks whether any historical queries are present that are similar within a given threshold, and then returns a report to the user containing either a ranked list of similar historical queries, or, if no similar historical queries are present, an estimate of the time required to run the user's proposed query. To decrease the amount of time required for the database tool to search for similar queries, the database tool stores in memory both those historical queries that are similar to a user's previously submitted queries, and those historical queries that are similar to queries that all users submit with high frequency. Then, when searching for the presence of similar historical queries, the database tool first compares the submitted query to those historical queries stored within the memory. By suggesting optimized similar historical queries when a user submits a sub-optimal query, the database tool is able to prevent the computer resource wastage that would otherwise occur. The database tool will be described in more detail using FIGS. 1 through 3.

FIG. 1 illustrates an example system 100. As seen in FIG. 1, system 100 includes one or more devices 110, a network 115, a database 120, and a database query tool 125. Generally, database query tool 125 operates to provide similar, more optimal queries (as measured by the amount of resources needed by database query tool 125 to execute the queries) to a user 105, when the user 105 submits a sub-optimal query 150 to database 120. In this manner, certain embodiments of database query tool 125 prevent the waste of valuable system resources.

The similar, more optimal queries suggested by database query tool 125 are chosen from historical queries previously submitted to database 120 and stored by database query tool 125 in second log 165. To efficiently determine if any historical queries similar to sub-optimal queries 150 submitted by users 105 exist, database query tool 125 places the historical queries stored in second log 165 into groups of similar historical queries, which it then stores in similarity buckets 175, using bucketing calculation 170. To provide users 105 with the most optimal similar historical queries, database query tool 125 ranks the historical queries stored in each similarity group according to both static and dynamic system features, as discussed in further detail below, in the discussion of FIG. 2B. Additionally, database tool 125 stores the historical queries a user 105 submits to database 120, along with similar, more optimal historical queries, in a list in first log 140 stored in memory 135. Database tool 125 also stores the historical queries users 150 submit to database 120 at greatest frequency, along with similar, more optimal historical queries, in a collection of queries 145 stored in memory 135. Then, to determine whether any similar historical queries exist, database query tool 125 first determines whether sub-optimal query 150 is similar to any historical queries stored in memory 135, and if not, database query tool 125 then determines if the sub-optimal query 150 belongs to any similarity groups stored in similarity buckets 175. Because database query tool 125 is able to perform this process without having to compare sub-optimal query 150 to each and every historical query stored in second log 165, the process is more computationally efficient than simply searching second log 165 for similar, more optimal queries.

If database tool 125 determines that similar, more optimal historical queries exist, it returns a report 160 to user 105 containing a ranked list of one or more of the similar, more optimal queries. In certain embodiments, if database tool 125 determines that similar, more optimal historical queries do not exist, database tool 125 returns a report 160 to user 105 containing user 105's original query, a statement that database query tool 125 could not find any similar, more optimal historical queries, and an estimate of the time required to execute query 150. User 105 then submits a new query 180 to database 120, chosen from report 160, and database query tool 125 performs query 180.

Devices 110 are used by users 105 to submit database queries to database 120. For example, users 105 can use devices 110 to communicate a query or a list of queries 150 directed at database 120 to database tool 125. Database tool 125 then determines whether query 150 is sub-optimal, and, if so, whether any similar, more optimal historical queries exist, either stored in memory 135 or in similarity buckets 175. Devices 110, can also receive a report 160 generated by database query tool 125 containing a ranked list of similar, more optimal historical queries. In certain embodiments, devices 110 can additionally receive a report 160 generated by database query tool 125 containing user 105's original query, a statement that database query tool 125 could not find any similar, more optimal historical queries, and an estimate of the time required to execute query 150. Devices 110 are further able to submit a second query 180 chosen from report 160 to database query tool 125, which database query tool 125 then executes in database 120. Devices 110 may also receive the results of the database queries submitted by database query tool 125 to database 120. In certain embodiments, devices 110 may communicate with database tool 125 through network 115 via a web interface.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example, and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores an organization's data to which users 105 direct queries 150 and 180. Additionally, database 120 stores historical queries previously submitted to database 120, both as a list in second log 165, and as groups of similar historical queries stored in similarity buckets 175. Each individual similarity bucket in the group of similarity buckets 175 holds groups of historical queries, formed such that each historical query in a group is similar to every other historical query in the group within a particular range of similarity that is unique to the specific similarity bucket stored in the group of similarity buckets 175. Here, the similarity between two historical queries can range from zero, when the historical queries are completely dissimilar, to one, when the historical queries are identical. This disclosure contemplates database 120 storing any number of buckets in the group of similarity buckets 175. For example, database 120 could store three similarity buckets in the group of similarity buckets 175, such that the first similarity bucket corresponds to a similarity range of 0.8 to 1.0, the second similarity bucket corresponds to a similarity range of 0.6 to 0.8, and the third similarity bucket corresponds to a similarity range of 0.4 to 0.6.

As seen in FIG. 1, database query tool 125 includes a processor 130 and a memory 135. This disclosure contemplates processor 130 and memory 135 being configured to perform any of the functions of database query tool 125 described herein. Generally, database query tool 125 performs bucketing calculation 170, where it calculates the similarity between pairs of historical queries stored in second log 165, places historical queries into similarity groups such that each historical query in a similarity group is similar to every other historical query in the similarity group within a specific similarity range, stores similarity groups in similarity buckets 175 according to the specific similarity ranges, and ranks the historical queries within each similarity group based on the resources required to execute the queries.

Additionally, database query tool 125 stores a user 105's historical queries, along with similar, more optimal historical queries, in a list corresponding to the user in a first log 140 in memory 135. Database query tool 125 also stores the historical queries most frequently submitted to database 120, along with similar, more optimal historical queries, in a collection of queries 145 stored in memory 135. Then, when database query tool 125 receives a sub-optimal query 150 from user 105, it performs similarity calculation 155 to determine whether any similar, more optimal historical queries exist. In performing similarity calculation 155, database query tool 125 first determines whether any similar, more optimal historical queries exist in memory 135, before searching for similar, more optimal historical queries in the similarity buckets 175. Thus, certain embodiments of database query tool 125 reduce traffic to database 120 by searching memory 135 for similar, more optimal historical queries, rather than searching similarity buckets 175 stored on database 120.

Processor 130 is any electronic circuitry, including, but not limited to microprocessors, application specific integrated circuits (ASIC), application specific instruction set processor (ASIP), and/or state machines, that communicatively couples to memory 140 and controls the operation of database tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of database query tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Memory 135 also stores a first log 140 containing a list for each user 105 of the historical queries the user 105 has previously submitted to database 120, as well as any similar, more optimal historical queries. Database query tool 125 stores such historical queries in memory 135 under the assumption that users 105 often submit queries 150 that are similar to queries they have previously submitted. Additionally, memory 135 contains a collection of queries 145, which contains all or a portion of any similarity groups from similarity buckets 175 containing historical queries that users 105 submit to database 120 most frequently. Database query tool 125 stores such historical queries in memory 135 based on the assumption that if all users 105 submit a historical query with great frequency, it is more likely that any given user 105 will submit this same query at some time in the future. As a result, certain embodiments of system 100 reduce the amount of time required by database query tool 125 to search for similar, more optimal historical queries, by storing those historical queries similar to queries user 105 is most likely to submit, in memory 135.

In certain embodiments, system 100 reduces the waste of valuable system resources that may occur when a user 105 submits a sub-optimal query 150 to database 120. Instead of executing the sub-optimal query 150, database query tool 125 suggests more optimal historical queries that are nonetheless similar to the sub-optimal query 150, which user 105 can submit to database 120. In this manner, certain embodiments of database query tool 125 reduce the time required for a user 105, who may not be an expert in query construction, to query database 120, by taking advantage of historical queries that have proven efficient.

Figure 2A:
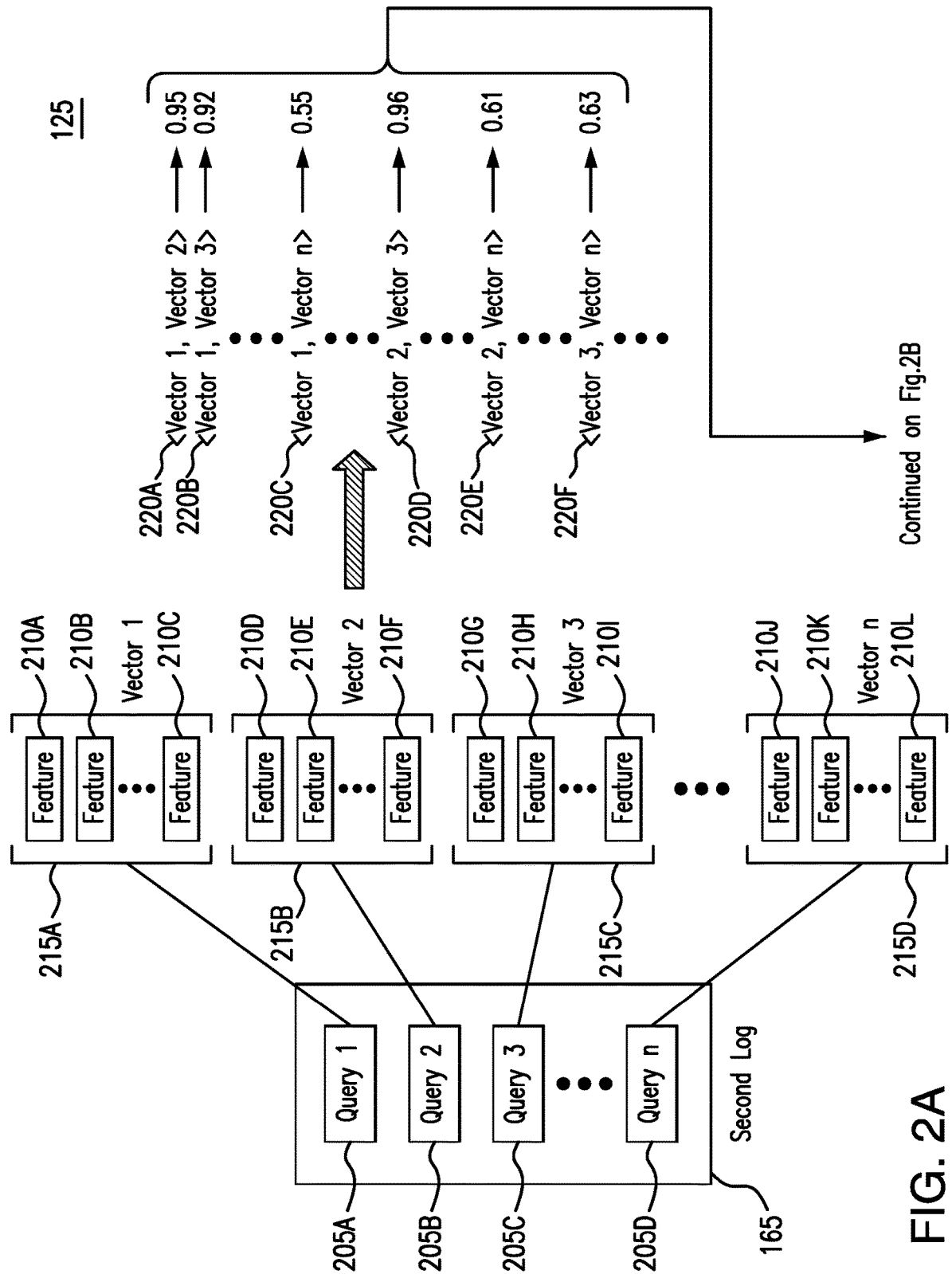
FIGS. 2A and 2B illustrate the process by which the database tool in the system of FIG. 1 determines groups of similar queries.
Figure 2B:
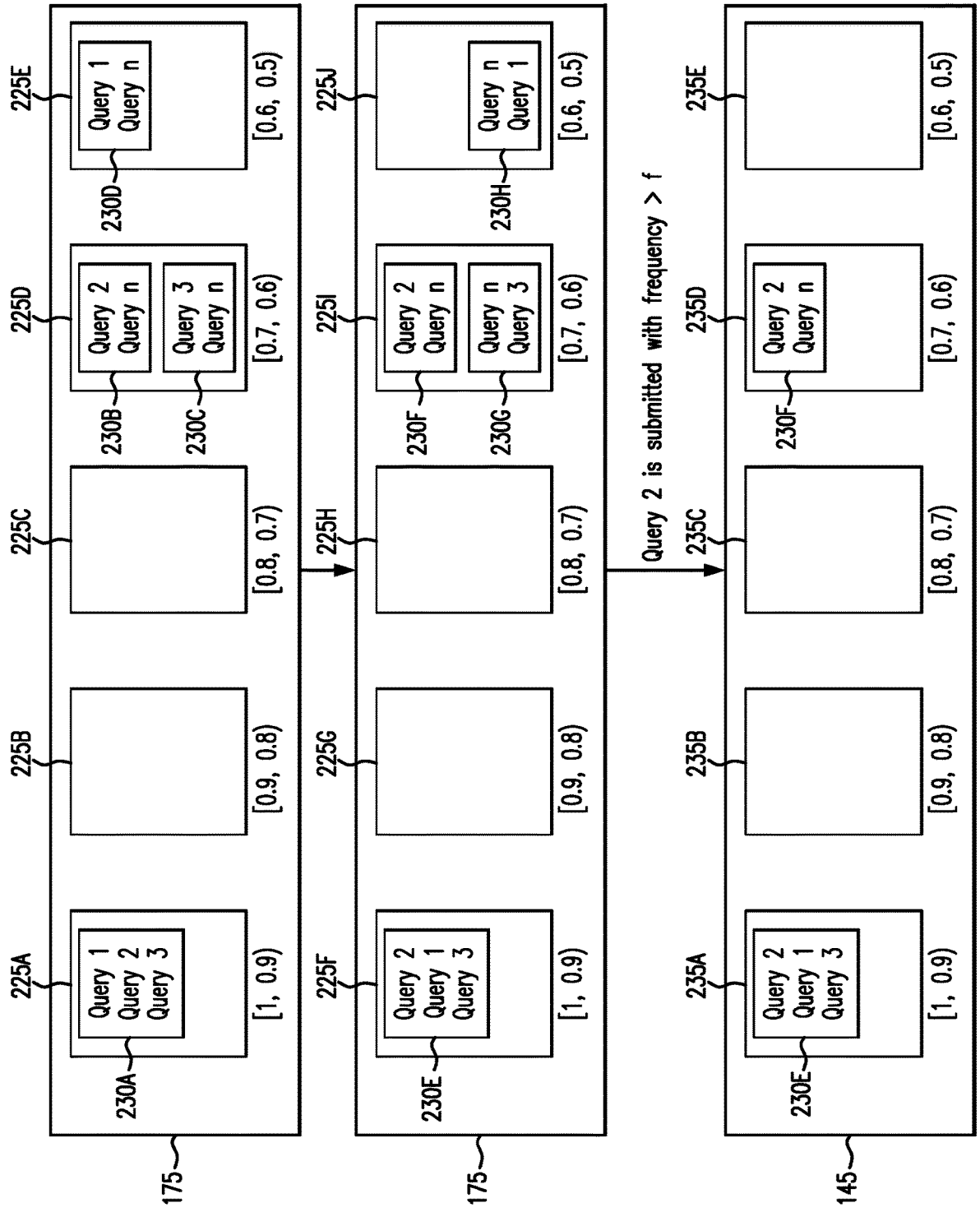

FIGS. 2A and 2B illustrate, in greater detail, the processes involved in bucketing calculation 170. Bucketing calculation 170 includes the processes of creating groups of similar historical queries, storing these groups in similarity buckets 175, and ranking the historical queries within these groups according to the amount of resources required by system 100 to execute the queries.

For simplicity, this example illustrates the bucketing calculation for historical queries 205A through 205D (among others) that were previously submitted by users 105 to database query tool 125 and are currently stored in second log 165. However, this disclosure contemplates any number of historical queries stored in second log 165. To determine if historical queries 205A through 205D are similar to one another, database query tool 125 calculates a similarity index between each pair of queries, where the similarity index ranges from zero to one. A similarity index of zero corresponds to a pair of queries that are completely dissimilar, while a similarity index of one corresponds to a pair of queries that are identical.

FIG. 2A illustrates the process by which database query tool 125 calculates the similarity indices. Database query tool 125 first splits the historical queries 205A through 205D into features 210A through 210L (among others) and forms vectors 215A through 215D using these features. For example, vector 215A is composed of features 210A, 210B, and 210C (among others), where database query tool 125 formed features 210A, 210B, and 210C from query one 205A. Database tool 125 then calculates the dot products 220A through 220F between pairs of vectors 215A through 215D and uses the results to determine the similarity indices between pairs of queries 205A through 205D. In this example, the dot product 220A between vector one 215A and vector two 215B leads to a similarity index of 0.95, the dot product 220B between vector one 215A and vector three 215C leads to a similarity index of 0.92, the dot product 220C between vector one 215A and vector n 215D leads to a similarity index of 0.55, the dot product 220D between vector two 215B and vector three 215C leads to a similarity index of 0.96, the dot product 220E between vector two 215B and vector n 215D leads to a similarity index of 0.61, and the dot product 220F between vector three 215C and vector n 215D leads to a similarity index of 0.63.

FIG. 2B illustrates the process of grouping similar historical queries into similarity groups and storing the similarity groups in similarity buckets 175. In this example, the similarity buckets 175 consist of five buckets 225A through 225E, covering a total similarity index range from 0.5 to 1.0. This disclosure, however, contemplates any number of similarity buckets, covering any similarity index range within the range 0.0 to 1.0. The first similarity bucket 225A corresponds to similarity range 0.9 to 1.0. Accordingly, first similarity bucket 225A will hold groups of similar historical queries for which the similarity indices calculated between every pair of historical queries within the group falls within the range 0.9 to 1.0. Similarly, the second similarity bucket 225B will hold groups of similar historical queries for which the similarity indices calculated between every pair of historical queries within the group falls within the range 0.8 to 0.9, the third similarity bucket 225C will hold groups of similar historical queries for which the similarity indices calculated between every pair of historical queries within the group falls within the range 0.7 to 0.8, the fourth similarity bucket 225D will hold groups of similar historical queries for which the similarity indices calculated between every pair of historical queries within the group falls within the range 0.6 to 0.7, and the fifth similarity bucket 225E will hold groups of similar historical queries for which the similarity indices calculated between every pair of historical queries within the group falls within the range 0.5 to 0.6.

As mentioned above, in the discussion of FIG. 2A, the similarity index between query one 205A and query two 205B is 0.95, the similarity index between query one 205A and query three 205C is 0.92, and the similarity index between query two 205B and query three 205C is 0.96. Therefore, the similarity index calculated for every pair of queries in the group of query one 205A, query two 205B, and query three 205C falls within the range of 0.9 to 1.0. As a result, query one 205A, query two 205B, and query three 205C form a first similarity group 230A that database query tool 125 ranks according to a set of static system features and stores in first similarity bucket 225A Similarly, query two 205B and query n 205D form a second similarity group 230B that database query tool 125 ranks according to the set of static system features and stores in fourth similarity bucket 225D; query three 205C and query n 205D form a third similarity group 230C that database query tool 125 ranks according to the set of static system features and stores in fourth similarity bucket 225D; and query on 205A and query n 205D form a fourth similarity group 230D that database query tool 125 ranks according to the set of static features and stores in fifth similarity bucket 225E.

In particular embodiments, the set of static features used by database query tool 125 to rank the historical queries stored in similarity groups includes the query features 210A through 210L (among others), cardinality, join conditions, and filter conditions. These static features relate to both the form of query 150 and the structure of the data stored in database 120. The effect that these static features will have on the amount of system resources required by database 120 to execute query 150 will remain constant in time, unaffected by network traffic, memory usage, or CPU usage.

In particular embodiments, the process of forming similarity groups, ranking the historical queries within each similarity group according to the set of static system features, and storing the similarity groups in similarity buckets 175 occurs once each day. For example, this process may occur once during the night when users 105 are less likely to submit queries 150 and 180 to database 120, and database query tool 125 would otherwise be idle. As a result, database query tool 125 is able to conserve system resources by reducing the demand on processor 130 during the day when processor 130 is performing similarity calculations 155.

Once database query tool 125 has placed the historical queries 205A through 205D into similarity groups, ranked the historical queries within each similarity group according to the set of static system features, and stored the similarity groups in similarity buckets 175, database query tool 125 further re-ranks the historical queries within each similarity group according to a set of dynamic system features. For example, database query tool 125 re-ranks first similarity group 230A stored in first similarity bucket 225A into first similarity group 230E stored in first similarity bucket 225F. Database query tool 125 similarly re-ranks second similarity group 230B stored in fourth similarity bucket 225D into second similarity group 230F stored in fourth similarity bucket 225I, re-ranks third similarity group 230C stored in fourth similarity bucket 225D into third similarity group 230G stored in fourth similarity bucket 225I, and re-ranks fourth similarity group 230D stored in fifth similarity bucket 225E into fourth similarity group 230H stored in fifth similarity bucket 225J.

In certain embodiments the set of dynamic system features includes network traffic, memory usage, and CPU usage. Database query tool 125 performs this re-ranking because when multiple users 105 access a database 120 simultaneously, historical queries that may have been optimal when submitted by a user 105 in isolation can become sub-optimal as a result of the current system resource demands created by other users 105. By re-ranking the historical queries within each similarity group based on dynamic system features, database query tool 125 is able to prioritize historical queries according to resource availability, such that, for example, when memory usage in database query tool 125 is high and a user 105 submits a query 150 that requires a large amount of memory to execute, database query tool 125 will suggest similar historical queries that require lower amounts of memory.

In particular embodiments, database query tool 125 performs this re-ranking multiple times throughout the day at a set re-ranking frequency. Performing the re-ranking at multiple times throughout the days helps to ensure that the historical queries within each similarity group are ranked according to the current resources of database tool 125.

In certain embodiments, the processes of ranking and re-ranking the historical queries stored in similarity groups is performed by a machine learning algorithm. For example, in particular embodiments, database query tool 125 attaches a weight to each of the static and dynamic features used to rank and re-rank the queries and uses machine learning to determine the optimal values for these weights.

FIG. 2B also illustrates the process by which database query tool 125 populates the collection of queries 145 stored in memory 135. In this example, database query tool 125 determines that users 105 submit query two 205B to database 120 with a frequency greater than a set frequency f. As a result, database query tool 125 copies similarity groups 230E and 230F, both containing query two 205B, into the collection of queries 145. Since query two 205B is submitted to database 120 frequently by users 105, there is a reasonable likelihood that any given user 105 will submit a query 150 to database 120 that is similar to query two 205B. By storing the highest ranked queries within similarity groups 230E and 230F in memory 135, database query tool 125 ensures that if a user 150 does submit a query 150 to database 120 that is similar to query two, database query tool 125 can access similar historical queries in memory 135 without accessing the similarity buckets 175 stored in database 120, thereby reducing the time required to return suggested similar, more optimal historical queries to user 105. While this example illustrates database query tool 125 copying the entire similarity groups 230E and 230F into the collection of queries 145, certain embodiments of system 100 contemplate database query tool 125 copying only a set number of the highest ranked queries within each similarity group 230E and 230F into the collection of queries 145. This may be desirable, for example, to reduce the total amount of data memory 135 stores.

By storing groups of similar historical queries in similarity buckets 175, bucketing calculation 170, illustrated in FIGS. 2A and 2B, provides an efficient means for determining whether a sub-optimal query 150 is similar, within a given threshold, to any historical queries stored in second log 165; to determine whether a sub-optimal query 150 is similar to any such historical queries, database query tool 125 merely determines whether the sub-optimal query 150 belongs to any similarity groups stored in similarity buckets 175, corresponding to similarity ranges above the given threshold. Because database query tool 125 is able to perform this process without having to compare sub-optimal query 150 to each and every historical query stored in second log 165, the process is more computationally efficient than simply searching second log 165 for similar, more optimal queries. Additionally, by ranking the historical queries within each similarity group according to dynamic features as well as static features, database query tool 125 is able to provide users 105 with optimal historical queries, tailored to the current resource demands of the system.

Figure 3A:
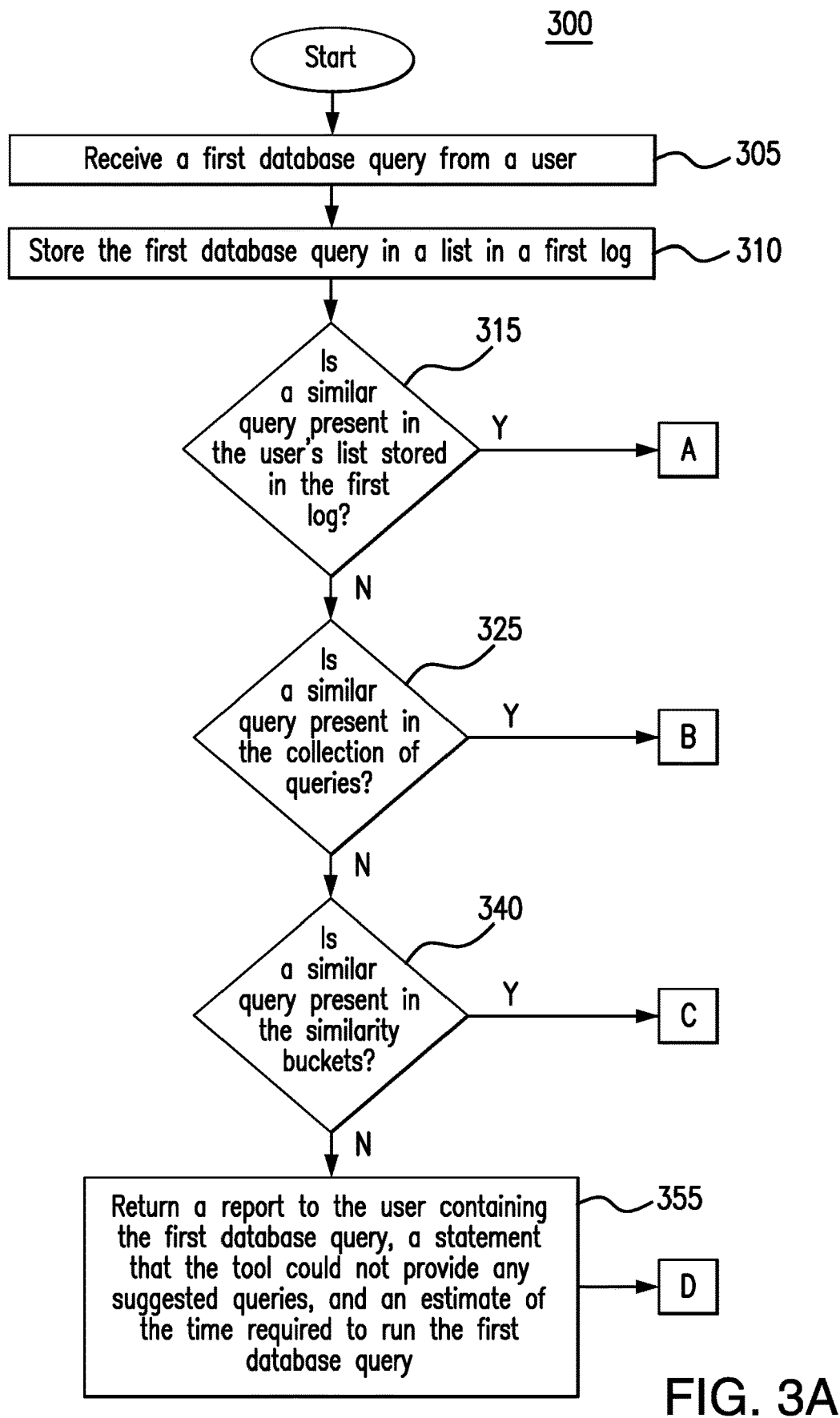

FIGS. 3A and 3B illustrate the process by which database query tool 125 determines whether any similar, more optimal historical queries exist when user 105 submits a sub-optimal query 150 to database 120. Here, a historical query is considered similar to query 150 if the similarity index between the historical query and query 150 is within a set threshold.

In certain embodiments, the set threshold is adjustable by user 105. This may be desirable, for example, for a user 105 who is unsure about the query 150 that the user 105 is submitting to database 120. In such situations, user 105 may want to increase the range of similarity indices covered by the set threshold to improve the chances that database query tool 125 will returns suggestions of similar, more optimal historical queries.

In step 305, database query tool 125 receives query 150 from user 105. Database query tool 125 then, in step 310, stores this query in a list corresponding to user 105 in a first log 140 stored in memory 135. Next, in step 315, database query tool 125 determines whether any similar, more optimal historical queries are present in user 105's list stored in first log 140. This process is similar to the process of determining similarity groups, described above for FIG. 2A. Database query tool 125 first splits user 105's query 150 into a set of features, and then forms a vector (database query vector) using these features. Database query tool 125 similarly forms vectors for the historical queries stored in first log 140 in the list corresponding to user 105 (list vectors). Database query tool 125 then computes dot products between the database query vector and the list vectors and uses these dot products to compute similarity indices. Historical queries stored in user 105's list are determined by database query tool 125 to be similar to query 150 if the similarity indices calculated between the historical queries and query 150 fall within the set threshold.

If database query tool 125 determines that no similar historical queries are stored in user 105's list in first log 140, in step 325 database query tool 125 next determines whether any similar historical queries are present in the collection of queries 145. Database query tool 125 first searches similarity bucket 235A, stored in the collection of queries 145, which corresponds to the highest similarity index range. If database query tool 125 determines that query 150 does not belong to any of the similarity groups 230E stored in first similarity bucket 235A, it proceeds to search second similarity bucket 235B, corresponding to the second highest similarity index range, provided that this similarity index range is greater than the set threshold. For example, in the example shown in FIG. 2B, if the set threshold is 0.8, database query tool 125 will search both the first similarity bucket 235A and the second similarity bucket 235B. On the other hand, if the set threshold is 0.9, database query tool 125 will only search the first similarity bucket 235A. If the set threshold is less than 0.8 and database query tool 125 determined that query 150 does not belong to any similarity groups stored in similarity buckets 235A and 235B, database query tool 125 will continue to search similarity buckets 235C through 235E until: (1) database query tool 125 determines that query 150 belongs to a similarity group stored in one of the similarity buckets; or (2) database query tool reaches a similarity bucket corresponding to a similarity index range outside the set threshold; or (3) database query tool 125 searches all similarity buckets 235C through 235E and determines that query 150 does not belong to any of the similarity groups stored within the collection of queries 145. This example assumes that the collection of queries 145 consists of five similarity buckets 235A through 235E. However, this disclosure contemplates the collecting of queries 145 containing any number of similarity buckets.

If database query tool 125 determines that query 150 does not belong to any similarity groups stored in the collection of queries 145, in step 340 database query tool 125 next determines whether any similar historical queries are present in similarity buckets 175. This process is similar to the process described above for step 325. Database query tool 125 first searches first similarity bucket 225F, stored in similarity buckets 175, which corresponds to the highest similarity index range. If database query tool 125 determines that query 150 does not belong to any of the similarity groups 230E stored in first similarity bucket 225F, it proceeds to search second similarity bucket 225G, corresponding to the second highest similarity index range, provided that this similarity index range is greater than the set threshold. For example, in the example shown in FIG. 2B, if the set threshold is 0.8, database query tool 125 will search both the first similarity bucket 225F and the second similarity bucket 225G. On the other hand, if the set threshold is 0.9, database query tool 125 will only search the first similarity bucket 225F. If the set threshold is less than 0.8 and database query tool 125 determines that query 150 does not belong to any similarity groups stored in similarity buckets 225F and 225G, database query tool 125 will continue to search similarity buckets 225H through 225J until: (1) database query tool 125 determines that query 150 belongs to a similarity group stored in one of the similarity buckets 225H through 225J; or (2) database query tool reaches a similarity bucket corresponding to a similarity index range outside the set threshold; or (3) database query tool 125 searches all similarity buckets 225H through 225J and determines that query 150 does not belong to any of the similarity groups stored within similarity buckets 175. This example assumes that similarity buckets 175 contains five similarity buckets 235A through 235E. However, this disclosure contemplates similarity buckets 175 containing any number of similarity buckets.

In particular embodiments, if database query tool 125 determines that query 150 does not belong to any similarity groups stored in the collection of queries 145, in step 355 database query tool 125 returns a report 160 to user 105 containing the database query 150 submitted by user 105, a statement that the database query tool could not provide any suggested queries, and an estimate of the time required to run query 150.

In particular embodiments, if database query tool 125 determines that user 105's list in first log 140 contains similar, more optimal historical queries, database query tool 125 returns a report 160 to user 105 containing a ranked list of a set number of the similar list queries, in step 320.

In particular embodiments, if database query tool 125 determines that query 150 belongs to a similarity group stored in the collection of queries 145, database query tool 125 first copies a set number of the highest ranked similar queries from the similarity group into user 105's list in first log 140, in step 330. Then, in step 335, database query tool 125 returns a report 160 to user 105 containing a ranked list of the historical queries stored in the similarity group.

If database query tool 125 determines that query 150 belongs to a similarity group stored in similarity buckets 175, database query tool 125 first copies a set number of the highest ranked similar queries from the similarity group into user 105's list in first log 140, in step 345. Then, in step 350, database query tool 125 returns a report 160 to user 105 containing a ranked list of a set number of the historical queries stored in the similarity group.

Finally, in step 360, database query tool 125 receives a second query 180 from user 105, selected from report 160, and in step 365 database query tool 125 executes the second query 180 in database 120.

Modifications, additions, or omissions may be made to method 300 depicted in FIGS. 3A and 3B. Method 300 may include more, fewer, or other steps. For example, steps may be performed in parallel or in any suitable order. While discussed as database query tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
a storage element comprising a first query bucket and a second query bucket, wherein:
the first query bucket is associated with a first range;
the second query bucket is associated with a second range lower than the first range;
the first query bucket comprises a first historical query and a second historical query;
the second query bucket comprises a third historical query and a fourth historical query, wherein:
a first similarity index computed between the first historical query and the second historical query falls within the first range, wherein computing the first similarity index comprises:
splitting the first historical query into a first set of features;
splitting the second historical query into a second set of features;
forming a first vector comprising the first set of features;
forming a second vector comprising the second set of features;
computing a first dot product of the first vector and the second vector; and
computing the first similarity index based on the first dot product; and
a second similarity index computed between the third historical query and the fourth historical query falls within the second range, wherein computing the second similarity index comprises:
splitting the third historical query into a third set of features;
splitting the fourth historical query into a fourth set of features;
forming a third vector comprising the third set of features;
forming a fourth vector comprising the fourth set of features;
computing a second dot product of the third vector and the fourth vector; and
computing the second similarity index based on the second dot product;
a hardware processor configured to:
receive a first query from a user; and
in response to receiving the first query:
split the first query into a fifth set of features;
form a fifth vector comprising the fifth set of features;
compute a third dot product of the fifth vector and the first vector;
compute a third similarity index based on the third dot product;
determine that the third similarity index does not fall within the first range; and
in response to determining that the third similarity index does not fall within the first range:
compute a fourth dot product of the fifth vector and the third vector;
compute a fifth dot product of the fifth vector and the fourth vector;
compute a fourth similarity index based on the fourth dot product;
compute a fifth similarity index based on the fifth dot product;
determine that both the fourth similarity index and the fifth similarity index fall within the second range; and
in response to determining that both the fourth similarity index and the fifth similarity index fall within the second range:
transmit a report to the user comprising the third historical query and the fourth historical query;
receive a second query selected from the report by the user; and
execute the second query.

2. The system of claim 1, wherein:
the third historical query and the fourth historical query are ranked within the second query bucket based on a set of static system features comprising at least one of query features, cardinality, join conditions, and filter conditions; and
the report transmitted to the user comprises the ranking of the third historical query and the fourth historical query.

3. The system of claim 2, wherein the hardware processor is further configured to re-rank the third historical query and the fourth historical query within the second query bucket based on a set of dynamic system features comprising at least one of network traffic, memory usage, and CPU usage.

4. The system of claim 3, wherein the hardware processor is configured to re-rank the third historical query and the fourth historical query at a set frequency.

5. The system of claim 3, wherein re-ranking the third historical query and the fourth historical query comprises using a machine learning algorithm.

6. The system of claim 1, wherein the hardware processor is further configured to:
receive a second query from the user; and
in response to receiving the second query:
split the second query into a sixth set of features;
form a sixth vector comprising the sixth set of features;
compute a sixth dot product of the sixth vector and the first vector;
compute a sixth similarity index based on the sixth dot product;
determine that the sixth similarity index does not fall within the first range; and
in response to determining that the sixth similarity index does not fall within the first range:
compute a seventh dot product of the sixth vector and the third vector;
compute a seventh similarity index based on the seventh dot product;
determine that the seventh similarity index does not fall within the second range; and
in response to determining that the seventh similarity index does not fall within the second range, return a second report to the user, the second report comprising:
a statement indicating that no similar queries were found; and
an estimate of the time to run the second query.

7. The system of claim 1, wherein:
the second query bucket further comprises a fifth historical query and a sixth historical query, wherein:
a sixth similarity index computed between the fifth historical query and the sixth historical query falls within the second range, wherein computing the sixth similarity index comprises:
splitting the fifth historical query into a sixth set of features;
splitting the sixth historical query into a seventh set of features;
forming a sixth vector comprising the sixth set of features;
forming a seventh vector comprising the seventh set of features;
computing a sixth dot product of the sixth vector and the seventh vector; and
computing the sixth similarity index based on the sixth dot product; and
in response to determining that the third similarity index does not fall within the first range, the hardware processor is further configured to:
compute a seventh dot product of the fifth vector and the sixth vector;
compute an eighth dot product of the fifth vector and the seventh vector;
compute a seventh similarity index based on the seventh dot product;
compute an eighth similarity index based on the eighth dot product;
determine that both the seventh similarity index and the eighth similarity index fall within the second range; and
in response to determining that each of the fourth similarity index, the fifth similarity, the seventh similarity index, and the eighth similarity index fall within the second range:
determine that both the fourth similarity index and the fifth similarity index are above a threshold; and
determine that at least one of the seventh similarity index and the eighth similarity index is below the threshold, wherein transmitting the report to the user comprising the third historical query and the fourth historical query is further performed in response to determining that at least one of the seventh similarity and the eighth similarity index is below the threshold.

8. A method comprising:
accessing a database comprising a first query bucket and a second query bucket, wherein:
the first query bucket is associated with a first range;
the second query bucket is associated with a second range lower than the first range;
the first query bucket comprises a first historical query and a second historical query;
the second query bucket comprises a third historical query and a fourth historical query, wherein:
a first similarity index computed between the first historical query and the second historical query falls within the first range, wherein computing the first similarity index comprises:
splitting the first historical query into a first set of features;
splitting the second historical query into a second set of features;
forming a first vector comprising the first set of features;
forming a second vector comprising the second set of features;
computing a first dot product of the first vector and the second vector; and
computing the first similarity index based on the first dot product; and
a second similarity index computed between the third historical query and the fourth historical query falls within the second range, wherein computing the second similarity index comprises:
splitting the third historical query into a third set of features;
splitting the fourth historical query into a fourth set of features;
forming a third vector comprising the third set of features;
forming a fourth vector comprising the fourth set of features;
computing a second dot product of the third vector and the fourth vector; and
computing the second similarity index based on the second dot product;
receiving a first query from a user; and
in response to receiving the first query from the user:
splitting the first query into a fifth set of features;
forming a fifth vector comprising the fifth set of features;
computing a third dot product of the fifth vector and the first vector;

computing a third similarity index based on the third dot product;
determining that the third similarity index does not fall within the first range; and
in response to determining that the third similarity index does not fall within the first range:
  computing a fourth dot product of the fifth vector and the third vector;
  computing a fifth dot product of the fifth vector and the fourth vector;
  computing a fourth similarity index based on the fourth dot product;
  computing a fifth similarity index based on the fifth dot product;
  determining that both the fourth similarity index and the fifth similarity index fall within the second range; and
  in response to determining that both the fourth similarity index and the fifth similarity index fall within the second range:
    transmitting a report to the user comprising the third historical query and the fourth historical query;
    receiving a second query selected from the report by the user; and
    executing the second query.

9. The method of claim 8, further comprising ranking the third historical query and the fourth historical query within the second query bucket based on a set of static system features comprising at least one of query features, cardinality, join conditions, and filter conditions, wherein the report transmitted to the user comprises the ranking of the third historical query and the fourth historical query.

10. The method of claim 9, further comprising re-ranking the third historical query and the fourth historical query within the second query bucket based on a set of dynamic system features comprising at least one of network traffic, memory usage, and CPU usage.

11. The method of claim 10, wherein the re-ranking of the third historical query and the fourth historical query occurs at a set frequency.

12. The method of claim 10, wherein re-ranking the third historical query and the fourth historical query comprises using a machine learning algorithm.

13. The method of claim 8, further comprising:
receiving a second query from the user; and
in response to receiving the second query:
  splitting the second query into a sixth set of features;
  forming a sixth vector comprising the sixth set of features;
  computing a sixth dot product of the sixth vector and the first vector;
  computing a sixth similarity index based on the sixth dot product;
  determining that the sixth similarity index does not fall within the first range; and
  in response to determining that the sixth similarity index does not fall within the first range:
    computing a seventh dot product of the sixth vector and the third vector;
    computing a seventh similarity index based on the seventh dot product;
    determining that the seventh similarity index does not fall within the second range; and
    in response to determining that the seventh similarity index does not fall within the second range, returning a second report to the user, the second report comprising:
      a statement indicating that no similar queries were found; and
      an estimate of the time to run the second query.

14. The method of claim 8, wherein:
the second query bucket further comprises a fifth historical query and a sixth historical query, wherein:
  a sixth similarity index computed between the fifth historical query and the sixth historical query falls within the second range, wherein computing the sixth similarity index comprises:
    splitting the fifth historical query into a sixth set of features;
    splitting the sixth historical query into a seventh set of features;
    forming a sixth vector comprising the sixth set of features;
    forming a seventh vector comprising the seventh set of features;
    computing a sixth dot product of the sixth vector and the seventh vector; and
    computing the sixth similarity index based on the sixth dot product; and
in response to determining that the third similarity index does not fall within the first range, the method further comprises:
  computing a seventh dot product of the fifth vector and the sixth vector;
  computing an eighth dot product of the fifth vector and the seventh vector;
  computing a seventh similarity index based on the seventh dot product;
  computing an eighth similarity index based on the eighth dot product;
  determining that both the seventh similarity index and the eighth similarity index fall within the second range; and
  in response to determining that each of the fourth similarity index, the fifth similarity, the seventh similarity index, and the eighth similarity index fall within the second range:
    determining that both the fourth similarity index and the fifth similarity index are above a threshold; and
    determining that at least one of the seventh similarity index and the eighth similarity index is below the threshold, wherein transmitting the report to the user comprising the third historical query and the fourth historical query is further performed in response to determining that at least one of the seventh similarity and the eighth similarity index is below the threshold.

15. An apparatus comprising a hardware processor configured to:
access a database comprising a first query bucket and a second query bucket, wherein:
  the first query bucket is associated with a first range;
  the second query bucket is associated with a second range lower than the first range;
  the first query bucket comprises a first historical query and a second historical query;
  the second query bucket comprises a third historical query and a fourth historical query, wherein:

a first similarity index computed between the first historical query and the second historical query falls within the first range, wherein computing the first similarity index comprises:
    splitting the first historical query into a first set of features;
    splitting the second historical query into a second set of features;
    forming a first vector comprising the first set of features;
    forming a second vector comprising the second set of features;
    computing a first dot product of the first vector and the second vector; and
    computing the first similarity index based on the first dot product; and
a second similarity index computed between the third historical query and the fourth historical query falls within the second range, wherein computing the second similarity index comprises:
    splitting the third historical query into a third set of features;
    splitting the fourth historical query into a fourth set of features;
    forming a third vector comprising the third set of features;
    forming a fourth vector comprising the fourth set of features;
    computing a second dot product of the third vector and the fourth vector; and
    computing the second similarity index based on the second dot product;
receive a first query from a user; and
in response to receiving the first query:
    split the first query into a fifth set of features;
    form a fifth vector comprising the fifth set of features;
    compute a third dot product of the fifth vector and the first vector;
    compute a third similarity index based on the third dot product;
    determine that the third similarity index does not fall within the first range; and
    in response to determining that the third similarity index does not fall within the first range:
        compute a fourth dot product of the fifth vector and the third vector;
        compute a fifth dot product of the fifth vector and the fourth vector;
        compute a fourth similarity index based on the fourth dot product;
        compute a fifth similarity index based on the fifth dot product;
        determine that both the fourth similarity index and the fifth similarity index fall within the second range; and
        in response to determining that both the fourth similarity index and the fifth similarity index fall within the second range:
            transmit a report to the user comprising the third historical query and the fourth historical query;
            receive a second query selected from the report by the user; and
            execute the second query.

16. The apparatus of claim 15, wherein:
the third historical query and the fourth historical query are ranked within the second query bucket based on a set of static system features comprising at least one of query features, cardinality, join conditions, and filter conditions; and
the report transmitted to the user comprises the ranking of the third historical query and the fourth historical query.

17. The apparatus of claim 16, wherein the hardware processor is further configured to re-rank the third historical query and the fourth historical query within the second query bucket based on a set of dynamic system features comprising at least one of network traffic, memory usage, and CPU usage.

18. The apparatus of claim 17, wherein the hardware processor is configured to re-rank the third historical query and the fourth historical query at a set frequency.

19. The apparatus of claim 17, wherein re-ranking the third historical query and the fourth historical query comprises using a machine learning algorithm.

20. The apparatus of claim 15, wherein the hardware processor is further configured to:
receive a second query from the user; and
in response to receiving the second query:
    split the second query into a sixth set of features;
    form a sixth vector comprising the sixth set of features;
    compute a sixth dot product of the sixth vector and the first vector;
    compute a sixth similarity index based on the sixth dot product;
    determine that the sixth similarity index does not fall within the first range; and
    in response to determining that the sixth similarity index does not fall within the first range:
        compute a seventh dot product of the sixth vector and the third vector;
        compute a seventh similarity index based on the seventh dot product;
        determine that the seventh similarity index does not fall within the second range; and
        in response to determining that the seventh similarity index does not fall within the second range, return a second report to the user, the second report comprising:
            a statement indicating that no similar queries were found; and
            an estimate of the time to run the second query.

\* \* \* \* \*